Jan. 8, 1924.

W. TATE 1,480,423

ATTACHMENT FOR SHAPING MACHINES

Filed July 6, 1923

Inventor
William Tate

Philip E. Barnes

Cushman, Bryant & Darby
Attorneys

Patented Jan. 8, 1924.

1,480,423

UNITED STATES PATENT OFFICE.

WILLIAM TATE, OF HIGH POINT, NORTH CAROLINA.

ATTACHMENT FOR SHAPING MACHINES.

Application filed July 6, 1923. Serial No. 649,845.

*To all whom it may concern:*

Be it known that I, WILLIAM TATE, a citizen of the United States, residing at High Point, in the county of Guilford and State of North Carolina, have invented new and useful Improvements in Attachments for Shaping Machines, of which the following is a specification.

This invention relates to improvements in shaping or cutting machines, and has as its object the provision of an attachment for such machines adapted to assist in guiding and gauging the stock during its presentation to the cutting devices.

This invention is an improvement upon the device of my Patent No. 1,435,758, granted Nov. 14, 1922, in which there is disclosed a rigid guide sleeve positioned below the cutter head and against which the stock, or a supporting pattern or carrier block may be pressed in presenting the stock to the cutters. As set forth in the patent, the use of such a guide prevents vibration of the material by the cutter spindle as occurs when the stock engages a guide mounted upon the spindle, and insures a uniformly smooth and unscored finished surface, which is not always obtainable when the material must engage a guide which rotates with the spindle.

An object of the present invention is to provide a rigid stock guide or gauge positioned above the cutter head which may supplement or may be used in lieu of the gauge disclosed in my former patent.

A further object of the invention is to provide a mounting or support for the additional guide and gauge whereby the same is maintained in fixed relation with the cutter head and is vertically movable therewith when the cutter spindle is adjusted relative to the work support.

A further object of the invention is to provide means for adjusting the guide relative to the cutter head so that the same may be adapted for use in conjunction with various sizes and types of cutters or tools of wood shaping machines.

Further, the invention seeks to provide an attachment which may be readily applied to a wood shaping machine, and which carries both the lower guide sleeve and the upper guide sleeve, with both of the sleeves independently adjustable relative to the cutter head and mounted so that both may be moved with the cutter spindle, which must some times be adjusted toward and from the work support.

Other objects of the invention relate more to details of construction and will become obvious as the description proceeds in connection with a preferred embodiment of the invention disclosed in the accompanying drawings, wherein:—

Figure 1:
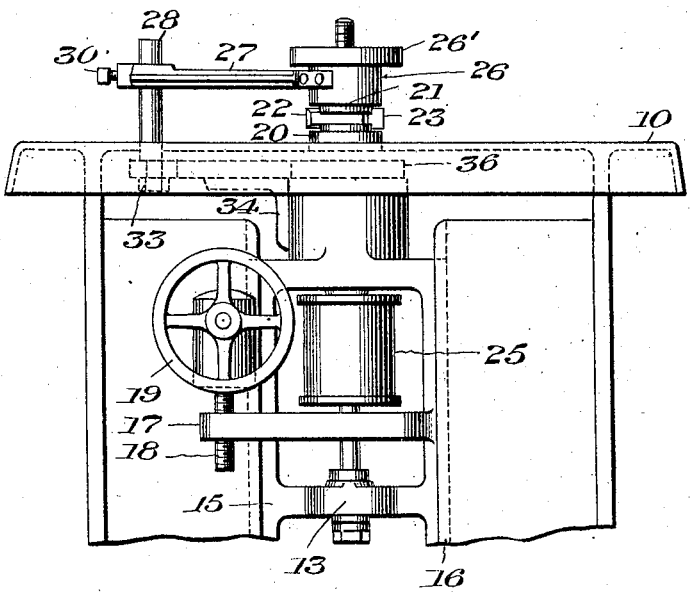
Figure 2:
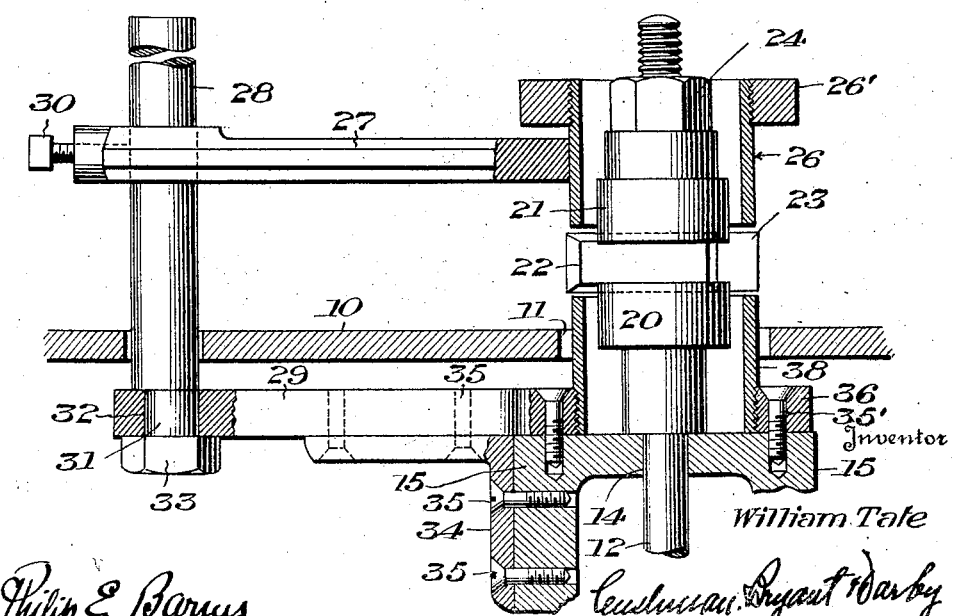

Fig. 1 is a fragmentary elevational view of a wood shaping machine showing the attachment applied thereto, and Fig. 2 is a fragmentary vertical sectional view.

Referring to the drawings for a more detailed description, 10 indicates a bed plate or work table provided with an opening 11, through which projects a spindle 12 having bearings 13, 14 in a slide 15 which is vertically adjustable in guide ways 16 beneath the bed plate. The slide carries a cross arm 17 having a threaded opening receiving a screw shaft 18 mounted beneath the table and rotatable by means of a hand wheel 19 operatively connected in any suitable manner for rotation of the shaft.

The upper end of the spindle carries a pair of spaced collars 20, 21 between which are mounted cutter bars 22, 23; and a nut 24 above the collars serves to clamp the cutters in position. The spindle may be driven in any suitable manner, as by means of a pulley 25 fixedly mounted thereon so as to be engaged by a belt driven from any suitable source of power (not shown).

The construction above described is old and well known in the art and, as shown in the drawings, is merely conventional in order to make clear the application of the invention, which is not limited either to the particular type of bed plate or cutter head assembly shown and described. It will be noted, however, that, broadly, the machine comprises a vertically adjustable spindle mounted in a suitable support and carrying a cutter head assembly.

Positioned above the cutters and surrounding the spindle is a suitable stock guide and gauge, in the present instance a sleeve 26 carried by an arm 27 which is mounted upon a standard 28. The arm is adjustable along the standard, which extends through an opening in the end of the arm; a set screw 30 is adapted to engage the standard and maintain the arm in fixed position. The standard has a reduced eccentric shank portion 31 which fits in an opening 32 of a suitable supporting arm 29 beneath the bed plate and is held against rotation by means of a nut 33 threaded upon the shank. Obviously, when the nut 33 is loosened and the standard 28 rotated upon its support and within the opening in the arm 27, the latter, together with the guide sleeve, will be adjusted to center the sleeve with respect to the shaft, this being due to the fact that the shank of the standard is eccentric with respect to the longitudinal axis of the remainder of the standard.

The support 29 is, preferably, mounted upon the spindle slide 15 so that the guide sleeve will be maintained in fixed relation with the cutter head when the spindle and cutter head are vertically adjusted; this will eliminate the necessity for independently setting the guide sleeve with respect to the cutter head whenever the spindle is adjusted. The arm 29 is carried by a bracket 34 which is secured, by means of screws 35, to the arm and the slide 15. It will thus be noted that whenever the slide is adjusted the arm, standard 28, together with its sleeve supporting arm 27, will be moved with the spindle and the cutter head.

It will be noted that the supporting arm 29 has an extension collar 36 internally threaded to receive a lower guide sleeve 38 such as is shown in my patent, referred to above. The sleeve 38, due to its threaded engagement with the collar 36, may be vertically adjusted relative to the cutter head by rotating the same, and any suitable holding means (not shown) may be provided to maintain the sleeve in fixed position, as set forth in my patent. Additional holding means, such as the screws 35' passing through the collar into the top of the slide 15, may be provided for the purpose of maintaining the collar and standard support securely in position.

Although it is not necessary, for the purpose of carrying out my invention, to provide the collar 36 upon the support 29 for the standard, since the latter may be independent of the collar and separately attachable to the slide, it will be understood that the construction described affords a complete attachment which may be readily positioned upon practically any form of shaping machine. The lower guide sleeve 38 may be adjusted by rotating the same in the collar 36, and the upper sleeve 26 may be independently adjusted by moving its arm 27 along the standard 28, the set screw 30 being provided for the purpose of maintaining it in any selected position. Moreover, the upper sleeve may be centered with respect to the spindle and cutter head by rotating the standard 28, which is accomplished by loosening the clamping nut 33. The adjustments referred to permit the adaptation of the attachment to modified forms of cutters and permit the use of the attachment with stock which may vary considerably in thickness.

It will also be observed that both of the guide sleeves are removable from the support; for removing the upper sleeve it is simply necessary to loosen the set screw 30 and slide the arm 27 from the standard and the lower sleeve may be removed by unscrewing the same from the supporting collar 36.

When the guide sleeve 26 is to be used with larger and modified forms of cutters a collar 26' may be threaded upon the upper end thereof, and the same may be removed when it interferes with operation upon stock or with the use of the guide in connection with cutters such as are shown in the drawings.

Both of the guide sleeves, which may be used separately or together, constitute fixed and rigid guides against which the stock or pattern block may be pressed when the stock is presented to the cutters. The sleeves do not rotate with the cutters and, hence, the stock will be firmly maintained in position without the vibration of the spindle being transmitted thereto. As a result, the finished shaped edge of the stock may be accurately cut and will always be found to be smooth and unscored throughout its extent. And, whenever the cutters are adjusted vertically with respect to the work support or bed plate, which is accomplished by rotation of any suitable adjusting means, in the present instance the hand wheel 19, both guiding sleeves will be adjusted therewith, thus maintaining the desired relation between the sleeves and cutters and eliminating the necessity for resetting the sleeves whenever the spindle and cutters are adjusted.

It should be understood that numerous modifications may be made in the structure which has been illustrated and described in detail without departing from the scope of the invention, which is more definitely defined in the following claims.

I claim:

1. In a device of the class described, the combination of a spindle, a cutter head assembly carried by said spindle, a support at one side of the cutter head, a stationary guide device substantially encircling said spindle on the opposite side of said cutter head from said support, and means for adjusting said cutter head and simultaneously adjusting said guide.

2. In a device of the class described, the combination of a spindle, a cutter head assembly carried by said spindle, a support at one side of the cutter head, a stationary guide device substantially encircling said spindle on the opposite side of said cutter head from said support, means for adjusting said cutter head and simultaneously adjusting said guide, and means for obtaining relative adjustments of the guide and cutter head.

3. In a device of the class described, the combination of a spindle, a cutter head assembly carried by said spindle, a support at one side of the cutter head, a stationary guide device substantially encircling said spindle on the opposite side of said cutter head from said support, means for adjusting said cutter head and simultaneously adjusting said guide, and means for adjusting said guide toward and from the cutter head.

4. In a device of the class described, the combination of a spindle, a cutter head assembly carried by said spindle, a support at one side of the cutter head, a stationary guide device substantially encircling said spindle on the opposite side of said cutter head from said support, means for adjusting said cutter head and simultaneously adjusting said guide, and means for adjusting said guide toward and from the cutter head and at a right angle to the axes of said spindle.

5. In a device of the class described, the combination of a bed plate, a spindle having one end projecting through said bed plate, a cutter head on said spindle above the bed plate, a support for said spindle below the bed plate, a stationary guide sleeve above said cutter head and encircling the spindle, said sleeve being carried by said support, and means for vertically adjusting said support to simultaneously adjust the guide sleeve and cutter head relative to said bed plate.

6. In a device of the class described, the combination of a bed plate, a spindle having one end projecting through said bed plate, a cutter head on said spindle above the bed plate, a support for said spindle below the bed plate, a stationary guide sleeve above said cutter head and encircling the spindle, said sleeve being carried by said support, a second stationary guide sleeve carried by the support below said cutter head, and means for vertically adjusting said support to simultaneously adjust the guide sleeves and cutter head relative to said bed plate.

7. In a device of the class described, the combination of a bed plate, a spindle having one end projecting through said bed plate, a cutter head on said spindle above the bed plate, a support for said spindle below the bed plate, a stationary guide sleeve above said cutter head and encircling the spindle, said sleeve being carried by said support, means for vertically adjusting said support to simultaneously adjust the guide sleeve and cutter head relative to said bed plate, and means for adjusting said guide sleeve relative to the cutter head.

8. In a device of the class described, the combination of a bed plate, a spindle having one end projecting through said bed plate, a cutter head on said spindle above the bed plate, a support for said spindle below the bed plate, a stationary guide sleeve above said cutter head and encircling the spindle, said sleeve being carried by said support, a second stationary guide sleeve carried by the support below said cutter head, means for vertically adjusting said support to simultaneously adjust the guide sleeves and cutter head relative to said bed plate, and means for adjusting said guide sleeves toward and from the cutter head.

9. An attachment for a machine of the class described comprising an arm having means for securing it to a spindle slide, a standard on said arm spaced from said securing means, a second arm on the standard projecting toward the said slide, and a guide sleeve adapted to encircle a spindle carried by said second mentioned arm.

10. An attachment for a machine of the class described comprising an arm having means for securing it to a spindle slide, a standard on said arm, a second arm on said standard extending toward said slide and adjustable along the standard, and a guide sleeve carried by said second mentioned arm and adapted to encircle a spindle.

11. An attachment for a machine of the class described comprising an arm having means at one end for securing the arm to a spindle slide, a standard on said arm, a second arm on said standard substantially paralleling the first mentioned arm and extending toward said slide, a guide sleeve carried by said second mentioned arm and adapted to encircle a spindle, and means for vertically adjusting said sleeve toward and from the plane of said first mentioned arm.

12. An attachment for a machine of the class described comprising an arm having means for securing it to a spindle slide, a guide sleeve carried by said arm and adapted to encircle a spindle, a standard on said arm, a second arm on said standard extending toward said slide, and a guide sleeve carried by said second mentioned arm, said sleeves being spaced apart and substantially in axial alignment.

13. An attachment for a machine of the class described comprising an arm having means for securing it to a spindle slide, a guide sleeve carried by said arm adapted to encircle a spindle, a standard on said arm, a second arm on said standard substantially paralleling said first mentioned arm, a guide sleeve carried by said second mentioned arm, said sleeves being spaced apart and substantially in axial alignment, and means for independently adjusting said sleeves toward and from each other.

14. An attachment for a machine of the class described comprising an arm having means for securing it to a spindle slide, a guide sleeve carried by said arm and adapted to encircle a spindle, a standard on said arm, a second arm on said standard extending toward said slide and a guide sleeve carried by said second mentioned arm, said sleeves being spaced apart and substantially in axial alignment, and each of said sleeves being removable from operative position.

In testimony whereof I have hereunto set my hand.

WILLIAM TATE.